(12) United States Patent
Reuter

(10) Patent No.: US 10,737,380 B2
(45) Date of Patent: Aug. 11, 2020

(54) METERING ROBOT AND TOOL HOLDER FOR SAME

(71) Applicant: Marco Systemanalyse und Entwicklung GmbH, Dachau (DE)

(72) Inventor: Martin Reuter, Dachau (DE)

(73) Assignee: Marco Systemanalyse und Entwicklung GmbH, Dachau (DE)

( * ) Notice: Subject to any disclaimer, the term of this patent is extended or adjusted under 35 U.S.C. 154(b) by 224 days.

(21) Appl. No.: 15/783,906

(22) Filed: Oct. 13, 2017

(65) Prior Publication Data
US 2018/0104814 A1    Apr. 19, 2018

(30) Foreign Application Priority Data
Oct. 14, 2016 (DE) .......................... 10 2016 119 619

(51) Int. Cl.
*B25J 9/02* (2006.01)
*B25J 19/00* (2006.01)
(Continued)

(52) U.S. Cl.
CPC ................ *B25J 9/023* (2013.01); *B25J 5/02* (2013.01); *B25J 9/0012* (2013.01); *B25J 9/026* (2013.01);
(Continued)

(58) Field of Classification Search
None
See application file for complete search history.

(56) References Cited

U.S. PATENT DOCUMENTS

| 4,466,770 A * | 8/1984 | Peroutky ................. B25J 9/026 |
| | | 414/751.1 |
| 4,566,346 A | 1/1986 | Petiteau |
| | (Continued) | |

FOREIGN PATENT DOCUMENTS

| CN | 104597269 A | 5/2015 |
| CN | 205599445 U | 9/2016 |
| | (Continued) | |

OTHER PUBLICATIONS

German search report dated Jul. 28, 2017 in corresponding German patent application No. 10 2016 119 619.3 (seven pages).
(Continued)

*Primary Examiner* — Jethro M. Pence
(74) *Attorney, Agent, or Firm* — Kilpatrick Townsend & Stockton LLP

(57) ABSTRACT

The present invention relates to a metering robot for dispensing liquid and/or pasty media having three degrees of freedom of movement oriented perpendicular to one another, having a base having two first linear guides spaced apart in parallel from one another; a portal bridge that is supported in a travelable manner on the two linear guides and that has a second linear guide oriented perpendicular to the two first linear guides; and a third linear guide for the movable guiding of a cart for receiving a metering unit that is oriented perpendicular to the first and second linear guides and that is travelable along the second linear guide. The metering robot has a work space that extends in a region that is located in the longitudinal direction of the two first linear guides in a prolongation of the region that extends directly between the two first linear guides.

15 Claims, 9 Drawing Sheets

(51) Int. Cl.
   *B25J 5/02* (2006.01)
   *B25J 9/00* (2006.01)
   *B25J 19/06* (2006.01)

(52) U.S. Cl.
   CPC ........... *B25J 19/0004* (2013.01); *B25J 19/06* (2013.01); *G05B 2219/45238* (2013.01)

(56) References Cited

U.S. PATENT DOCUMENTS

| | | |
|---|---|---|
| 5,368,425 A | 11/1994 | Mills et al. |
| 5,476,358 A | 12/1995 | Costa |
| 5,505,777 A | 4/1996 | Ciardella et al. |
| 9,393,787 B2 | 7/2016 | Ikushima |
| 2012/0152050 A1 | 6/2012 | Richardson |
| 2014/0291270 A1 | 10/2014 | Heiniger et al. |

FOREIGN PATENT DOCUMENTS

| | | |
|---|---|---|
| CN | 209946687 U | 1/2020 |
| DE | 198 10 333 A1 | 9/1999 |
| DE | 102 16 571 A1 | 10/2003 |
| EP | 2 151 282 A1 | 2/2010 |
| EP | 2 664 413 A1 | 11/2013 |
| JP | S58-143195 U | 9/1983 |
| JP | S58-181594 A | 10/1983 |
| JP | S60-221273 A | 11/1985 |
| JP | S61-020280 U | 2/1986 |
| JP | S62-293408 A | 12/1987 |
| JP | S63-180490 A | 9/1988 |
| JP | H02-106283 A | 4/1990 |
| JP | H03-044581 U | 4/1991 |
| JP | H06-79562 A | 3/1994 |
| JP | H07-001261 A | 1/1995 |
| JP | H08-229752 A | 9/1996 |
| JP | 2001-300872 A | 10/2001 |
| JP | 2003-269451 A | 9/2003 |
| JP | 2004-269201 A | 9/2004 |
| JP | 2006-198510 A | 8/2006 |
| JP | 2007-210081 A | 8/2007 |
| JP | 2014-61525 A | 4/2014 |
| JP | 2015-087306 A | 5/2015 |
| KR | 10-1406196 B1 | 6/2014 |
| KR | 10-1411448 B1 | 6/2014 |

OTHER PUBLICATIONS

Examination report dated Mar. 14, 2019 of corresponding Korean Patent Application No. 10-2017-0133842 (14 pages).
Communication dated Mar. 4, 2020, of the corresponding Chinese Patent Application No. 201710959359.5. (ten pages).

* cited by examiner

METERING ROBOT AND TOOL HOLDER FOR SAME

This application claims priority to German Application No. 102016119619.3, filed Oct. 14, 2016, the disclosure of which is incorporated by reference herein.

The present invention relates to a metering robot with which liquid and/or pasty media such as adhesives can be applied to a workpiece in a targeted manner. The invention further relates to a tool holder for providing at least one metering unit, preferably for a metering robot in accordance with the invention.

So-called Cartesian robots are typically used to be able to apply liquid or pasty media to a workpiece in a targeted manner. Such Cartesian robots as a rule have two or three linear guides which are aligned perpendicular to one another and by means of which a metering unit can be moved to a desired position in space to be able to apply adhesive to defined points of a workpiece. Such metering robots can, for example, be designed as so-called table-top robots in which the workpiece is travelable along a first linear guide on a base of the robot. The base in this process supports at least one fixed-position support at whose head end a cantilever oriented perpendicular to the first linear guide is provided which has a second linear guide at which in turn a third linear guide is again travelable for the movable guiding of a cart to receive a metering unit. The third linear guide is in this respect travelable along the second linear guide and is oriented perpendicular to the first and second linear guides. In this manner, the metering unit can be traveled to a specific point to be able to apply an adhesive to a workpiece that is located on the base on the cart movable along the first linear guide. Unlike such table-top robots, inline robots—that is Cartesian robots that are used in or along production lines— do not have any base having a fixed support; such inline robots rather frequently have two first linear guides that are arranged in a stationary manner above the production line and that are aligned perpendicular to the transport direction of the production line. In this respect a bridge is supported in a travelable manner on the two first linear guides and a second linear guide oriented perpendicular to the two first linear guides is arranged along said bridge. A third linear guide is in turn provided for the movable guiding of a cart for receiving a metering unit, with this third linear guide being oriented perpendicular to the two first linear guides and the second linear guide and being travelable along the second linear guide. The work space can only be accessed with difficulty due to this construction or arrangement of the individual linear guides over the work space.

Although table-top robots and inline robots thus have certain common features, they nevertheless differ from one another with respect to the position and arrangement of the individual linear guides so that it would be desirable to provide a metering robot that can be used equally as a table-top robot and an inline robot.

It is thus the underlying object of the present invention to provide a uniform design for a metering robot so that the robot can be used in as flexible a manner as possible.

This object is satisfied by a metering robot having the features of claim 1 and in particular in that a work space of the metering unit extends in a region that extends in the longitudinal direction of the two first linear guides in a prolongation of the region that extends directly between the two first linear guides.

Unlike with conventional table-top robots or inline robots, the work space is therefore not located in the travel range of the first linear guide viewed in a plan view; the work space with the metering robot in accordance with the invention rather extends in a region that extends in a prolongation of the two first linear guides and therebetween. If therefore the work space is defined as a rectangular area viewed in a plan view, the two first linear guides spaced apart in parallel with one another extend perpendicular to a side area of the rectangular work space, but without projecting into it. The metering robot can thus be used as a table-top robot and as an inline robot: if the metering robot is, for example, to be used at a production line and thus as an inline robot, the conveyor belt of a production line can extend through the work space, whereby a continuous production process can be ensured. As a table-top robot, in contrast, the metering robot can have a fixed-position work surface or a table in the region of its work space and the workpieces to be processed can be positioned on it manually or by means of a further robot.

Preferred embodiments of the metering robot in accordance with the invention will now be described in the following with further embodiments also being able to result from the description of the Figures, from the drawing and from the dependent claims.

Provision can thus be made in accordance with a first embodiment that the portal bridge has a traverse section that spans the spacing between the two first linear guides and that is located, viewed in a plan view, offset in a direction of the first linear guide from those points at which the portal bridge stands on the two first linear guides. For this purpose, the portal bridge has two supports that are travelable on the two first linear guides, with the head ends of the two supports being connected to one another by the traverse section. Viewed in a plan view, the traverse section is not located in the region of the two supports in this respect; cantilevers can rather project from the head ends of the supports, for example; they are oriented in the direction of the two first linear guides and are connected to one another by the traverse section at their freely projecting ends. The traverse section thus so-to-say forms an overhang with respect to the feet points of the two supports of the portal bridge viewed in a plan view or side view, whereby it can be ensured that the metering unit can be moved into any desired regions of the work space.

In accordance with a further embodiment, provision can be made that the portal bridge and/or the base of the metering robot is/are designed in a hollow box construction, and indeed preferably composed of sheet steel. Steel or sheet steel thus namely has a smaller thermal coefficient of expansion in comparison with cast aluminum from which the support construction of conventional Cartesian robots is typically designed, which has the consequence that the metering robot only deforms slightly under the effect of heat. The precision of the metering robot is thus only dependent on any temperature changes to a small degree. In addition, due to the small thermal coefficient of expansion, the metering robot is only subject to small temperature-induced restraints and restraint stresses so that the smooth movement of carts travelable along the linear guides of the metering robot does not suffer under the influence of temperature changes.

Sheet steel having a thermal coefficient of expansion of 11 to $18*10^{-6}$ 1/K, in particular in the range from approximately 12 to $17*10^{-6}$ 1/K, can preferably be used as the construction material for the portal bridge and for the base. It can in particular prove to be advantageous to produce the portal bridge and the base of the metering robot from the same material such as from steel, for example, having a thermal coefficient of expansion of $12\times10^{-6}$ 1/K or from stainless steel having a thermal coefficient of expansion of $17 \times 10^{-6}$ 1/K since in this case the portal bridge and the base deform to the same degree on any temperature changes so that there can also not be any restraints between the portal bridge and the base.

Even though the hollow box construction of the portal bridge already provides satisfactory stiffness properties, it can prove to be advantageous in accordance with a further embodiment to divide the inner space of the portal bridge designed in a hollow box construction into a plurality of cells by stiffening ribs since the portal bridge can hereby be made even stiffer. Provision can furthermore be made in accordance with a further embodiment to fill at least single ones of these cells with a polyurethane foam or with another vibration-absorbing material since dynamic strains on the metering robot can hereby be kept small.

The inner space of the base designed in a hollow box construction can, in contrast, be filled with concrete, for example, or also with a granular material such as gravel or sand in order thus to provide the base and thus the total metering robot with the required stability.

The steel sheets from which the base and the portal bridge are produced in a hollow box construction can admittedly be prefabricated with a comparatively accurate dimension. If, however, the metal sheets are welded to one another to form a hollow box construction, the individual metal sheets may deform slightly under certain circumstances. In order therefore to be able to install the respective linear guides and/or carts guided by the linear guides with accurate dimensioning at constructions of the metering robot produced in a hollow box construction such as at the base, at the portal bridge or at the support construction for the third linear guide, provision is made in accordance with a further embodiment that a hardenable leveling compound by which any dimensional deviations can be compensated is provided between each construction produced in a hollow box construction and the respective linear guide and/or the respective cart. For example, the first linear guides can be brought into the correct position during the assembly of the metering robot by means of positioning patterns in channels formed in the base, whereupon the channels are cast with a hardenable potting material such as epoxy resin to fix the position of the respective linear guide. After the hardening of the potting material, the linear guides can then be secured to the base with the aid of fastening screws that are screwed through the potting compound into the base.

In accordance with a further embodiment, the metering robot can have a single drive motor to travel the portal bridge. If, in contrast, each support of the portal bridge were to be traveled by its own drive motor, this could result in a canting of the portal bridge on an insufficient synchronization of the two motors. If, in contrast, both supports of the portal bridge are moved by one and the same drive motor in that the motor shaft of the drive motor is drive-effectively connected to both supports of the portal bridge, both supports experience the same feed without a complex synchronization of a plurality of drive motors being necessary for this purpose.

In accordance with a further embodiment, the only drive motor for traveling the portal bridge can, for example, be located in the region that extends directly between the two first linear guides. In this case, the drive motor can comprise a continuous motor shaft having two shaft ends of which each drives one of two drive belts that are each coupled to a traverse connecting the supports of the portal bridge. In this respect, the two drive belts are preferably also composed of the same material, for example of steel, from which the portal bridge and the base are also produced so that again no restraints can also occur between the drive belts and the base and the portal bridge. The stiffness properties of the metering robot with respect to rotations about the axis of the motor shaft and with respect to rotations about an axis that is oriented in the direction of the third linear guide (vertical axis) are also improved by the arrangement of the drive motor between the two first linear guides and by the drive of the portal bridge via the two drive belts.

In accordance with a further embodiment, the metering robot can comprise a drive motor for traveling the cart along the third linear guide, for which purpose this drive motor can be drive-effectively connected to the cart via a drive belt preferably produced from steel. To prevent unwanted slip between the drive shaft of this drive motor and this drive belt, this drive motor can have a drive roller that is mounted at its motor shaft and that drives the drive belt, with the drive roller being coated with a material that effects a coefficient of friction with respect to the drive belt that is higher than the coefficient of friction of steel on steel. For example, the drive roller can be coated with a hard granular material having a diameter of approximately 3 to 10 µm, whereby a coefficient of friction in an order of magnitude of approximately 0.17 results with respect to the drive belt produced from steel.

So that the cart travelable along the third linear guide also maintains its position on any power failure, provision can be made in accordance with a further embodiment that the drive motor for traveling this cart comprises a braking device such as a spring-magnet brake that blocks the drive motor in the currentless state. For example, the spring-magnet brake can comprise an electromagnet that holds a spring-loaded latch in a position in which it is out of engagement with the drive shaft of the drive motor in the live state. On a power failure, the electromagnet in contrast no longer generates a magnetic field so that the spring pre-loaded latch can move into contact with the motor shaft, which has the consequence that the motor shaft and thus the cart driven by the drive motor cannot move along the third linear guide.

Provision can be made in accordance with a further embodiment that a plurality of light barriers evenly spaced apart from one another are provided along the first, second and/or third linear guides, wherein the unit travelable along the respective linear guide in the form of the portal bridge, the third linear guide and/or the cart for receiving a metering unit has a switch lug that interrupts the light barriers and that has a width corresponding to half the spacing between two adjacent light barriers. The effective number of measurement points provided by the light barriers is hereby increased by a factor of 2 since both the interruption of the respective light barrier and the release of same can be used as a measurement point.

In accordance with a further embodiment, the metering robot can comprise a cart that is travelable along the third linear guide and that has, for the receiving of a metering unit, an adapter unit having a gripping mechanism that is preferably pneumatically actuable and that is configured to secure an adapter of the metering unit with shape matching to the cart travelable along the third linear guide. A tool changer is thus so-to-say created by the adapter unit that enables the metering robot to independently exchange its metering unit serving as a tool.

The adapter unit can have an electric and/or pneumatic connection interface that is configured to be connected to a counter-connection interface of the adapter of the metering unit as a result of the securing of the adapter of the metering unit to the cart travelable along the third linear guide. In this process, both the energy supply and/or compressed air supply or the vacuum supply of the metering unit and the data exchange with the metering unit take place via the two interfaces. If therefore the tool changer replaces one metering unit with another metering unit, the electric and/or pneumatic interface between the robot and the metering unit is simultaneously interrupted in this process and is subsequently reestablished without separate worksteps by a further robot or by an operator being required.

In accordance with a further aspect of the invention, a plurality of metering units can be provided from a tool holder in accordance with claim 14. The tool holder can in particular be equipped with a plurality of metering units that can be filled with different media and/or that can have differently configured metering valves. The metering robot can thus remove metering units filled with different media from the tool holder while using a tool changer, the metering units optionally also being able to have different metering valves in order to be able to apply different media and/or different metering quantities to a workpiece as required. A continuous operation of the metering robot can hereby be ensured since downtimes are administered with that otherwise occur on the replacement or change of the cartridges of a metering unit. Downtimes that would otherwise occur when a metering valve had to be manually replaced by another are also administered with, whereby the capacity of the metering robot can be increased overall.

The metering valves of metering units are admittedly normally closed valves, that is valves that are closed in the non-actuated state; a small quantity of medium can nevertheless exit through the metering valve under certain circumstances on a longer non-use of a metering unit. To prevent this, provision is made in accordance with the invention that the tool holder can have a sealing element for each metering unit received by it that seals the metering valve of the respective metering unit.

In accordance with an embodiment, the at least one sealing element can in this respect be provided at a fixed position at the tool holder, whereas the at least one metering unit is removably received by the tool holder. If therefore a metering unit is removed from the tool holder by a metering robot, the sealing element is automatically removed from the metering valve without a separate workstep being required for this purpose.

In accordance with an embodiment, the sealing element can comprise an annular lip seal that sealingly surrounds an outlet nozzle of a metering valve. In this respect, the lip seal can, for example, be received by a closed cup at the side disposed opposite the metering valve or it can be closed at the side disposed opposite the metering valve by a cover injection molded onto or formed in one piece with the lip seal.

In accordance with another embodiment, the sealing element can comprise an adhesive strip of which one section is adhesively bonded over an outlet nozzle of a metering valve and of which another section is releasably secured to the tool holder, for example by means of a clamp. If a metering unit whose metering valve is sealed by such an adhesive strip is removed from the tool holder, the adhesive strip is in this respect automatically pulled off from the outlet valve to which it is adhesively bonded so that said outlet valve is released for dispensing medium to be dosed.

If the sealing element is configured as a lip seal, the tool holder can, in accordance with a further embodiment, furthermore comprise a suction apparatus that is in sealed fluid communication with the outlet nozzle of the metering valve via the lip seal. In this manner, any media residue can be sucked out of the outlet nozzle so that it cannot clog the outlet nozzle.

The invention will be explained in more detail by way of example in the following with reference to the enclosed drawings, wherein.

Figure 1:
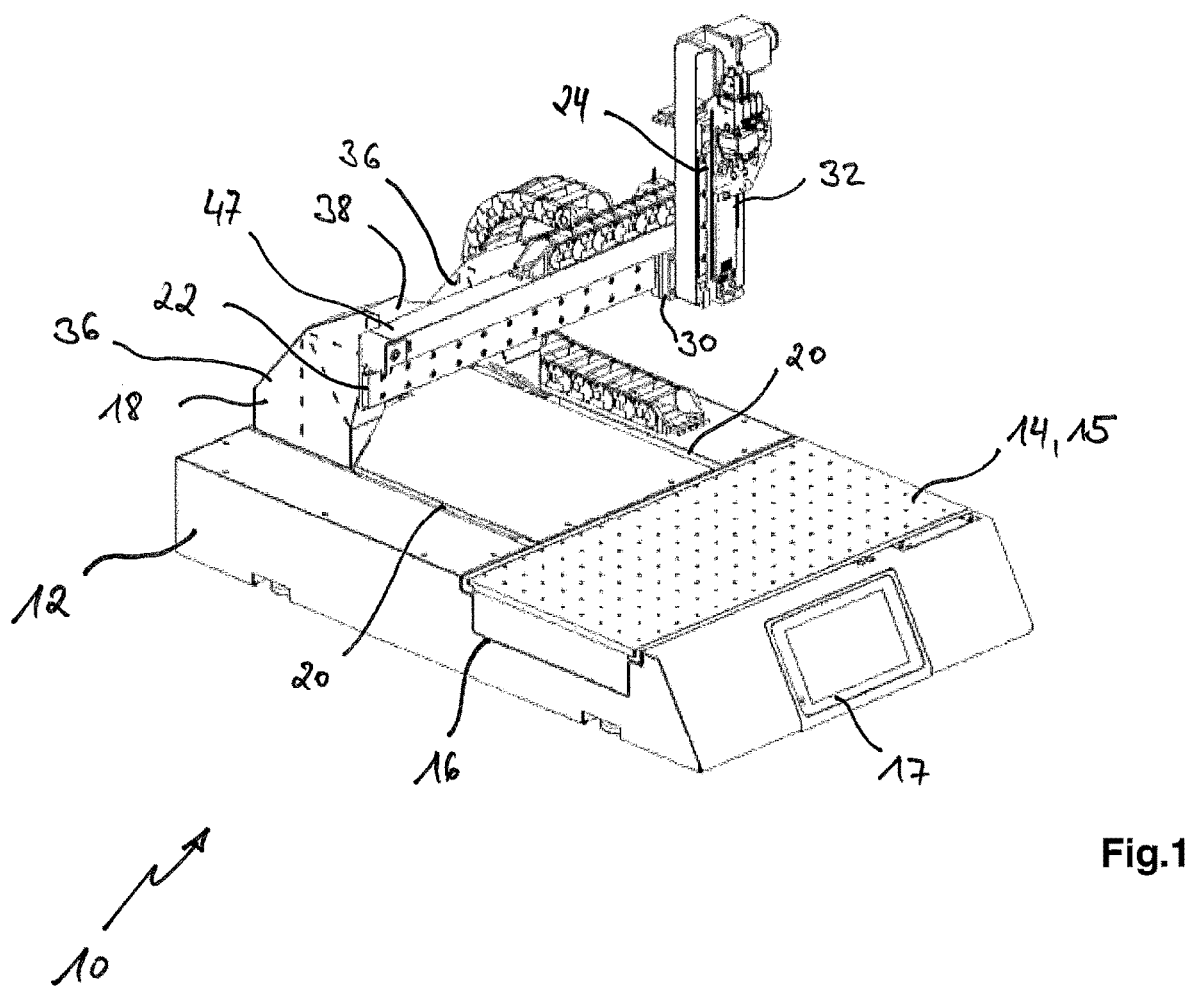
FIG. 1 shows a perspective representation of a metering robot in accordance with the invention from the front.

FIG. 1 shows a metering robot 10 in accordance with the invention in its totality in a perspective representation obliquely from the front. The metering robot 10 has a base 12 that is configured in a hollow box construction and that supports a portal bridge 18 that is likewise configured in a hollow box construction and that is travelable along two first linear guides 20 (see FIG. 2) that are spaced apart in parallel from one another and that are received by the base 12. The portal bridge 18 has a second linear guide 22 which is oriented perpendicular to the two first linear guides 20 and along which a third linear guide 24 is travelably supported for the movable guiding of a third cart 32 for receiving a metering unit, not shown here. This third cart 32 is also called a third cart 32 here. The third linear guide 24 is in this respect oriented perpendicular to the two first linear guides 20 and to the second linear guide 22 such that the third cart 32 for receiving a metering unit can be traveled in a targeted manner to a desired point in space.

As has already previously been mentioned, the base 12 is configured in a hollow box construction and forms a recess 16 in its front region for receiving a work surface 14 that defines the work space 15 of the metering robot 10 in a plan view. The work table or the work surface 14 is thus rigidly connected to the linear guides 20, 22, 24 supported by the base 12 via the base 12 configured in a hollow box construction and also supporting the individual linear guides 20, 22, 24, whereby the robot 10 is warp resistant and stiff in itself. The base 12 furthermore has two mutually spaced apart reception channels (not shown) that serve for the reception of the two first linear guides 20. The two first liner guides 20 can be cast by means of epoxy resin 23 in these reception channels in order thus to compensate any dimensional deviations that can occur on the manufacture of the base 12.

As can be seen from FIG. 1, the work space 15 that is defined by the work surface 14 in a plan view extends in the metering robot 10 in accordance with the invention in a region that extends in the longitudinal direction of the two first linear guides 20 in a prolongation of the region that extends directly between the two first linear guides 20. In other words, the two first linear guides 20 therefore extend in the perspective representation of FIG. 1 behind the work surface 14 without penetrating into the work space. Since the third linear guide 24 together with the third cart 32 that serves for receiving a metering unit is arranged eccentrically at the portal bridge 18, the metering unit can thus be traveled by means of the metering robot 10 in a targeted manner to any desired point within the work space 15 in order thus to be able to apply a medium such as an adhesive to a workpiece located at the work surface 14.

The base 12 admittedly has a certain inherent stiffness due to its hollow box construction; however, in order also to give the base 12 the required stability, it can be at least partly filled with concrete in its inner space. As can furthermore be seen from FIG. 1, the base 12 has a drawer 17 in its front region whose front receives operating elements of the robot 10 and at whose rear side interfaces for the power supply and data communication can be provided.

Figure 2:
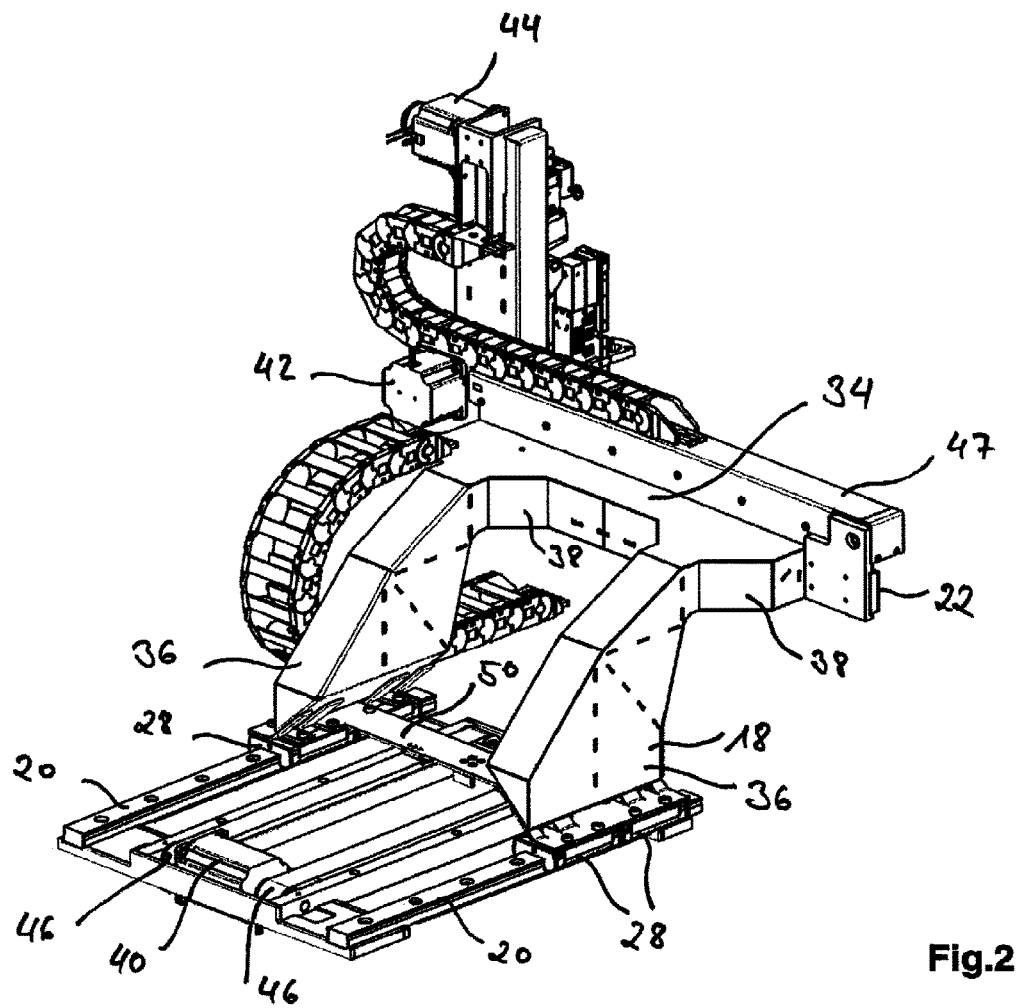
FIG. 2 shows a perspective representation of the metering robot in accordance with FIG. 1 without a base from the rear.
Figure 3:
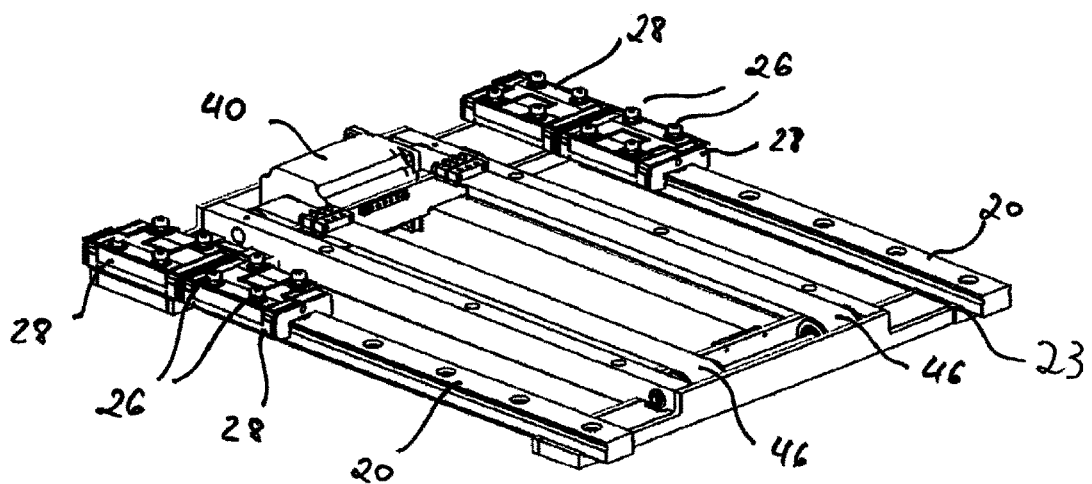
FIG. 3 shows a perspective representation to explain the drive to explain the drive of the portal bridge of the metering robot.
Figure 4:
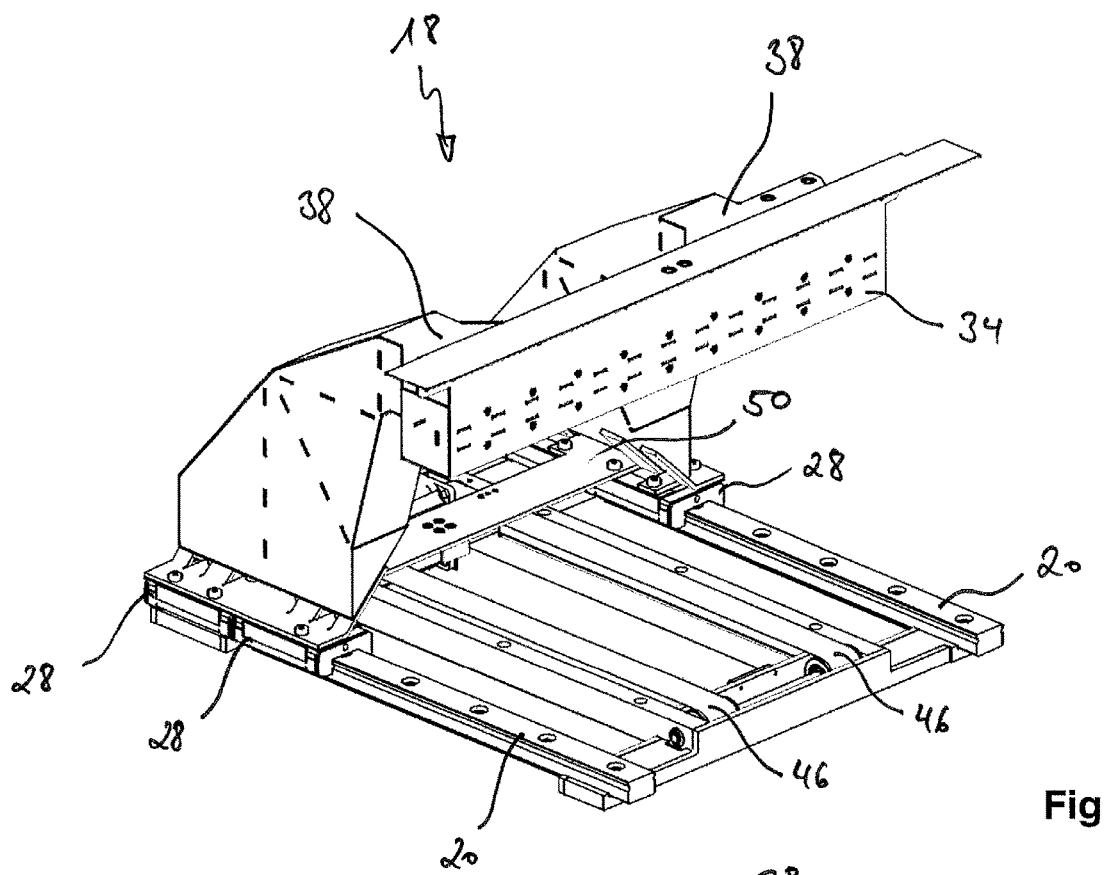
FIG. 4 shows a representation corresponding to FIG. 3 with a portal bridge arranged at the first linear guides.

FIG. 2 shows the metering robot 10 in accordance with the invention in a perspective representation obliquely from the rear, with the base 12 having been omitted with respect to FIG. 1 so that here the two mutually spaced apart first linear guides 20 can be better recognized. Each of these first linear guides 20 is formed by a rail, with two respective first carts 28 being able to be traveled along each of these rails (see also FIG. 3) and with the portal bridge being mounted on said carts with the help of screws 26 (see FIG. 3) so that the portal bridge 18 is supported on the two first linear guides 20 in a travelable manner by means of the first four carts 28. To compensate dimensional irregularities of the portal bridge 18, a respective hardenable leveling compound can also be provided here between the first carts 28 and the corresponding contact areas of the portal bridge 18. Since the two first linear guides 20 are arranged spaced apart from one another and the portal bridge 18 is supported by means of the four first carts in a travelable manner on the two first linear guides 20, the guide formed in this manner is comparatively stiff so that the two first linear guides 20 can be designed as relatively narrow without this impairing the stiffness of the guide.

The portal bridge 18 is driven or traveled by means of a single drive motor 44 that is located in the region that extends directly between the two first linear guides 20. Two first drive belts 46 are driven by the first drive motor 44, for which purpose the first drive motor 44 comprises a continuous motor shaft having two shaft ends of which each drives one of the two drive belts 46 (see also FIG. 3). The drive belts 46 are in this respect coupled to a traverse 50 that connects the two supports 36 of the portal bridge 18 to one another. Since both supports 36 of the portal bridge 18 thus always experience the same feed due to the drive by the single drive motor 44, the portal bridge 18 or the carts 28 on which portal bridge 18 stands cannot cant.

As already mentioned, the portal bridge 18 is also preferably designed in a hollow box construction, with the inner space of the portal bridge 18 being able to be divided into a plurality of cells by a number of stiffening ribs 52 (see FIG. 5) of which at least one cell can be filled with a polyurethane foam or with another vibration-absorbing material.

Figure 5:
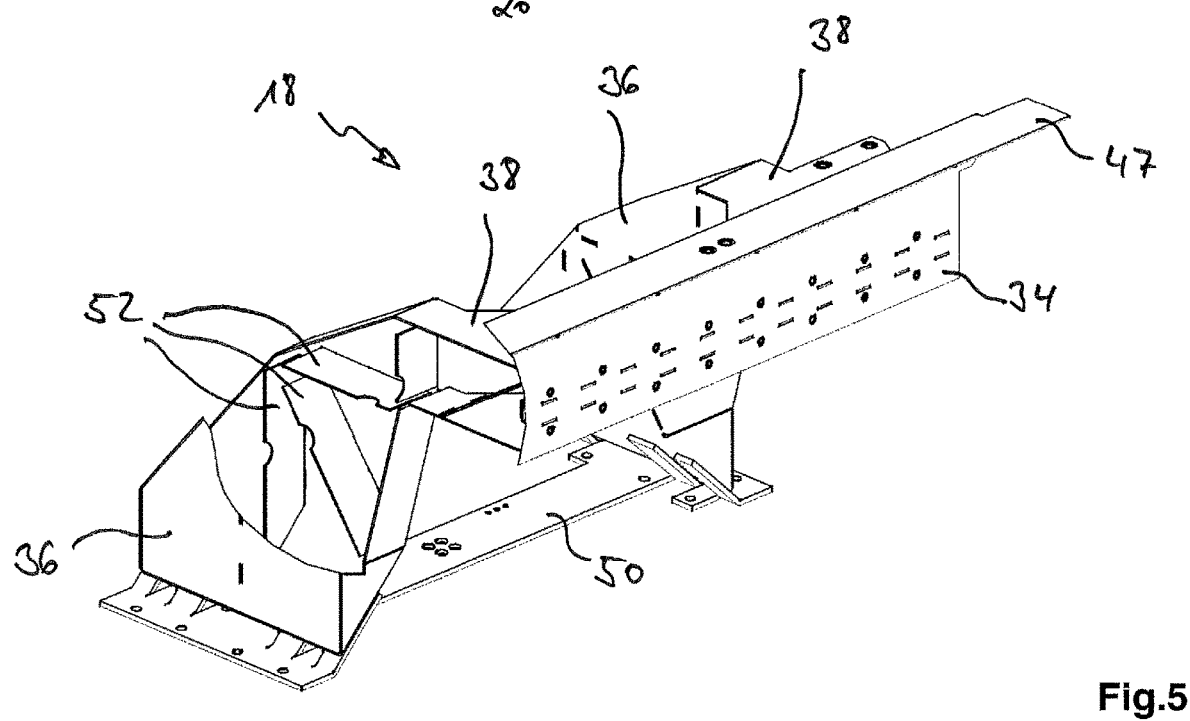
FIG. 5 shows a perspective representation of a portal bridge with a partly broken away side wall.

As can in particular can be seen from a joint review of FIGS. 2 and 5, the portal bridge 18 has a traverse section 34 that extends between the two supports 36 and that thus spans the spacing between the two first linear guides 20. The traverse section 34 is in this respect located in the direction of the two first linear guides 20, viewed in a plan view, offset from those points at which the supports 36 of the portal bridge 18 stand on the two first linear guides. For this purpose, a projection or a cantilever 38 is formed at the head end of each support 36 of the portal bridge 18 and extends, viewed in a plan view, in the direction of the respective first linear guide 20. The traverse section 34 of the portal bridge 18 formed in one piece with these cantilevers 38 adjoins the cantilevers 38 so that said traverse section forms, viewed in a plan view or in a side view, an overhang with respect to the feet points of the supports 36 of the portal bridge 18. The metering unit of the metering robot 10 can thus travel to any desired point in its work space even though the first linear guides 20 do not extend into the work space 15.

As can furthermore be seen from FIG. 2, the portal bridge 18 supports a second drive motor 42 by means of which a second cart 30, that supports the third linear guide 24, can be traveled along the second linear guide 22. The third cart 32 is longer than each of the first carts 28 and the second linear guide 22 is also wider than each of the two first linear guides 20 so that the required stiffness is also present here. The metering robot 10 furthermore has a third drive motor 44 (see FIG. 6) by means of which the third cart 32 can be traveled along the third linear guide 24. Since the drive of the second cart 30 is the same as the drive of the third cart 32, the following statements are restricted to the drive of the third cart 32. Like the first carts 28, the third cart 32 is also driven by the third drive motor 44 by means of a (third) drive belt 48, with a drive roller 54 being able to be mounted on the motor shaft of this drive motor 44, the drive roller being coated with a material 56 that has a higher coefficient of friction than the third drive belt 48 in order thus to improve the traction of the drive belt 48. The second drive belt that is driven by the second drive motor 42 is not recognizable in the Figures since it extends beneath a cover 47 at the portal bridge 18. The third drive motor 44 can comprise, in accordance with the invention, a braking device, not shown, such as a spring-magnet brake that blocks the drive motor 44 in the currentless state.

Coating the drive roller 54 with a special friction material proves to be advantageous in this respect since the third drive belt 48, also like all other drive belts of the metering robot 10, can be made from steel and thus has a comparatively low grip. Producing the drive belts from steel, however, proves to be advantageous to the extent that the portal bridge 18, the base 12, the traverse 50 and the linear guides 20, 22, 24 can also be produced from steel since unlike cast aluminum steel, from which Cartesian robots are typically produced, steel has a comparatively small thermal coefficient of expansion in the range from approximately 12 to $17 \times 10^{-6}$ 1/K. Due to the fact that the portal bridge 18 and the base 12 are in particular produced from sheet steel, the metering robot is only subject to small heat expansion so that the precision of the metering robot 10 also does not suffer on larger temperature fluctuations. The portal bridge 18, the base 12, and the drive belts 46, 48 can, however, also be produced from stainless steel or another material of low thermal expansion, for example, as long as the same material or materials having similar coefficients of thermal expansion are used so that no unwanted stress effects and restraint effects occur between the individual components of the metering robot 10 on temperature fluctuations.

Figure 6:
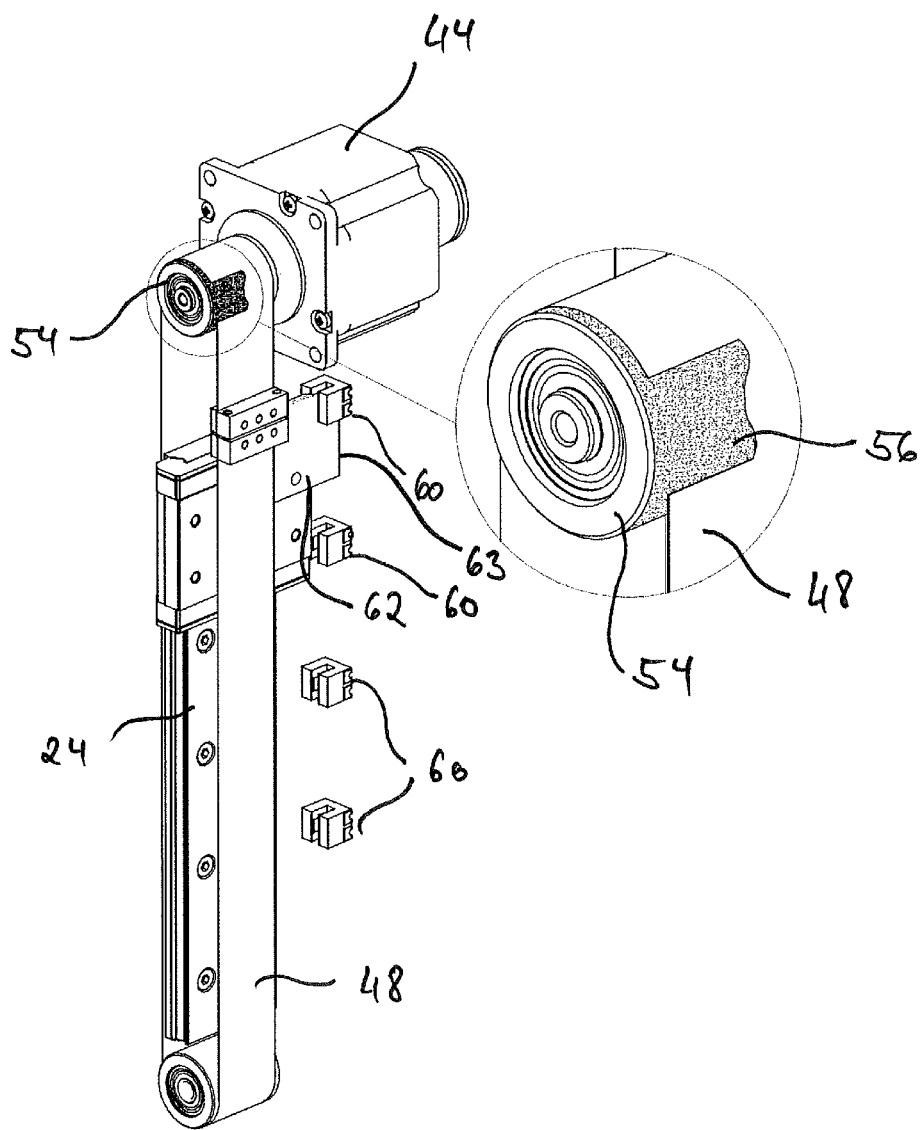
FIG. 6 shows a perspective schematic representation of a third linear guide together with a drive.

As can furthermore be seen from FIG. 6, a plurality of light barriers 60 that are arranged uniformly spaced apart from one another are provided along the third linear guide 24. These light barriers 60 are in this respect interrupted or released by a switch lug 62 that is attached to the third cart 32 that supports the metering unit of the robot 10. The switch lug 62 in this respect has a width 63 that corresponds to half the spacing between two adjacent light barriers 60. The effective number of the measurement points provided by the light barriers 60 can hereby be increased by a factor of 2 since both the interruption and the release of the respective light barrier 60 can be used as a signal pulse. To increase the precision of the measurement points of the light barriers 60, the light barriers 60 can furthermore have a small aperture.

The metering robot 10 in accordance with the invention has a design overall such that the mass of inertia of its movable components reduces from bottom to top so that the second drive motor 42 for traveling the second cart 30 along the second linear guide 22 can be weaker than the first drive motor 40 and the third drive motor 44 for traveling the third cart 32 along the third linear guide 24 can in turn be weaker than the second drive motor 42.

Figure 7:
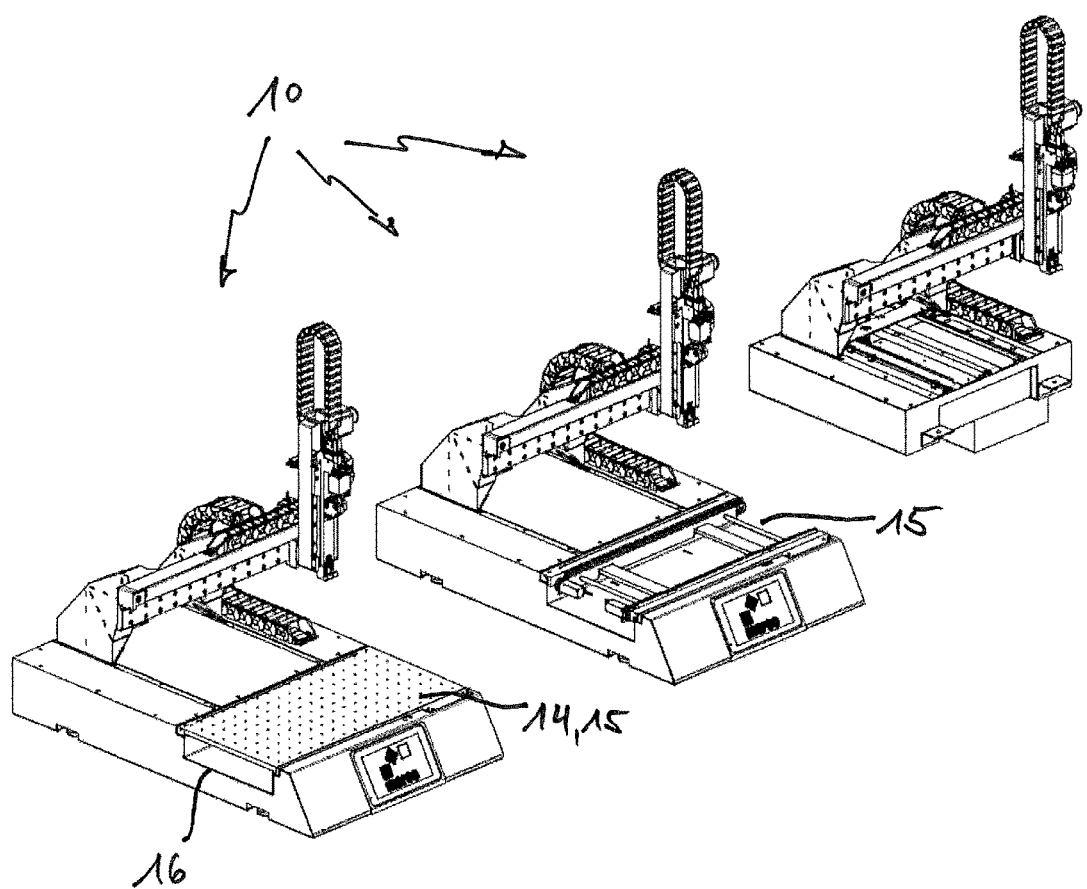
FIG. 7 shows three different constructions of a metering robot in accordance with the invention in a perspective representation.

The metering robot 10 in accordance with FIG. 7 can be used both as a table-top robot and as an inline robot due to the configuration in accordance with the invention of the metering robot 10 with its work space 15 that extends in a prolongation of the two first linear guides 20 and therebetween. The left hand image of FIG. 7 thus shows an embodiment as a table-top robot in which the recess 16 in the base 12 is covered by a work surface 14 serving as a table. The middle image of FIG. 7 in contrast shows the use of the robot 10 as an inline robot, with the work surface 14 having been removed so that a conveyor belt, not shown here, can be led through the recess 16 in the base 12. The metering robot 10 is also used as an inline robot in the representation of FIG. 7 at the far right in that it forms the last machine at a transfer line.

Figure 8:
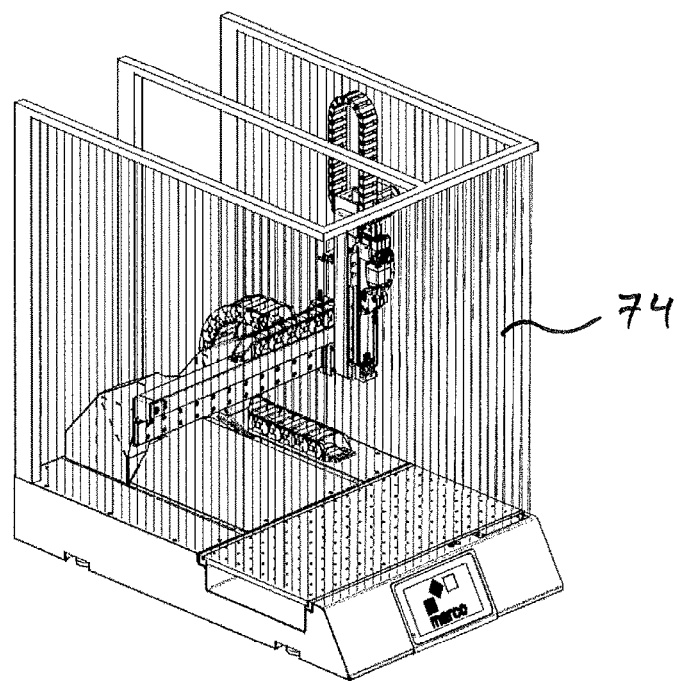
FIG. 8 shows the metering robot in accordance with FIG. 1 with a light sensor to protect the work space.

In accordance with FIG. 8, the metering robot 10 in accordance with the invention is provided with a light fence 74 by which an operator is protected from the movement of the robot 10 in that the movement of the robot 10 is stopped when a light barrier of the light fence 74 is interrupted. The work space 15 of the robot 10 can furthermore be divided into two mutually separate regions (not shown) by the light fence 74 so that the robot 10 can, for example, process a workpiece in the half protected by the light fence 74, while the operator introduces a new workpiece into the work space 15 in the other half.

To accelerate the tool change, that is the replacement of a metering unit 102 by another metering unit 102, in the metering robot 10 in accordance with the invention, the third cart 32 that is travelable along the third linear guide 24 has an adapter unit 64 serving as a tool changer and having a lever or gripping mechanism 68 (see FIGS. 13 and 14) that can be actuated by a pneumatic cylinder 66 at the third cart 32. The gripping mechanism 68 is pivoted about a pivot pin 69 by the actuation of the pneumatic cylinder 66, whereby an adapter plate 103 of a metering unit 102 can be secured at the third cart 32 in that the upper end 130 of the adapter plate 103 is urged toward the third cart 32 by a nose section 70 of the gripping mechanism 68. For this purpose, the upper end 130 of the adapter plate 103 in particular has a gable roof-like contour 109, with the nose section 70 riding on the oblique surface 108 of the gable roof-like contour 109 remote from the third cart 32 and gliding along said contour when the pneumatic cylinder 66 is traveled out to secure a metering unit 102 to the third cart 32 via its adapter plate 103. The lower end 131 of the adapter plate 103, in contrast, is received by a reception groove 71 at the third cart 32 so that the adapter plate 103 and thus the metering unit 102 is secured to the third cart 32 in a shape-matched manner when the piston of the pneumatic cylinder 66 is traveled out. If, in contrast, the piston of the pneumatic cylinder 66 is retracted, the gripping mechanism 68 is pivoted counter-clockwise about the pivot pin 69. In this respect, a pressing surface of the gripping mechanism 68 rides on the oblique surface 107 of the gable roof-like contour 109 facing the third cart 32 and urges it away from the third cart 32, whereby the upper end 130 of the adapter plate 103 is released, which has the consequence that the metering unit 102 secured in the reception groove 71 can tilt away from the third cart 32.

Figure 13:
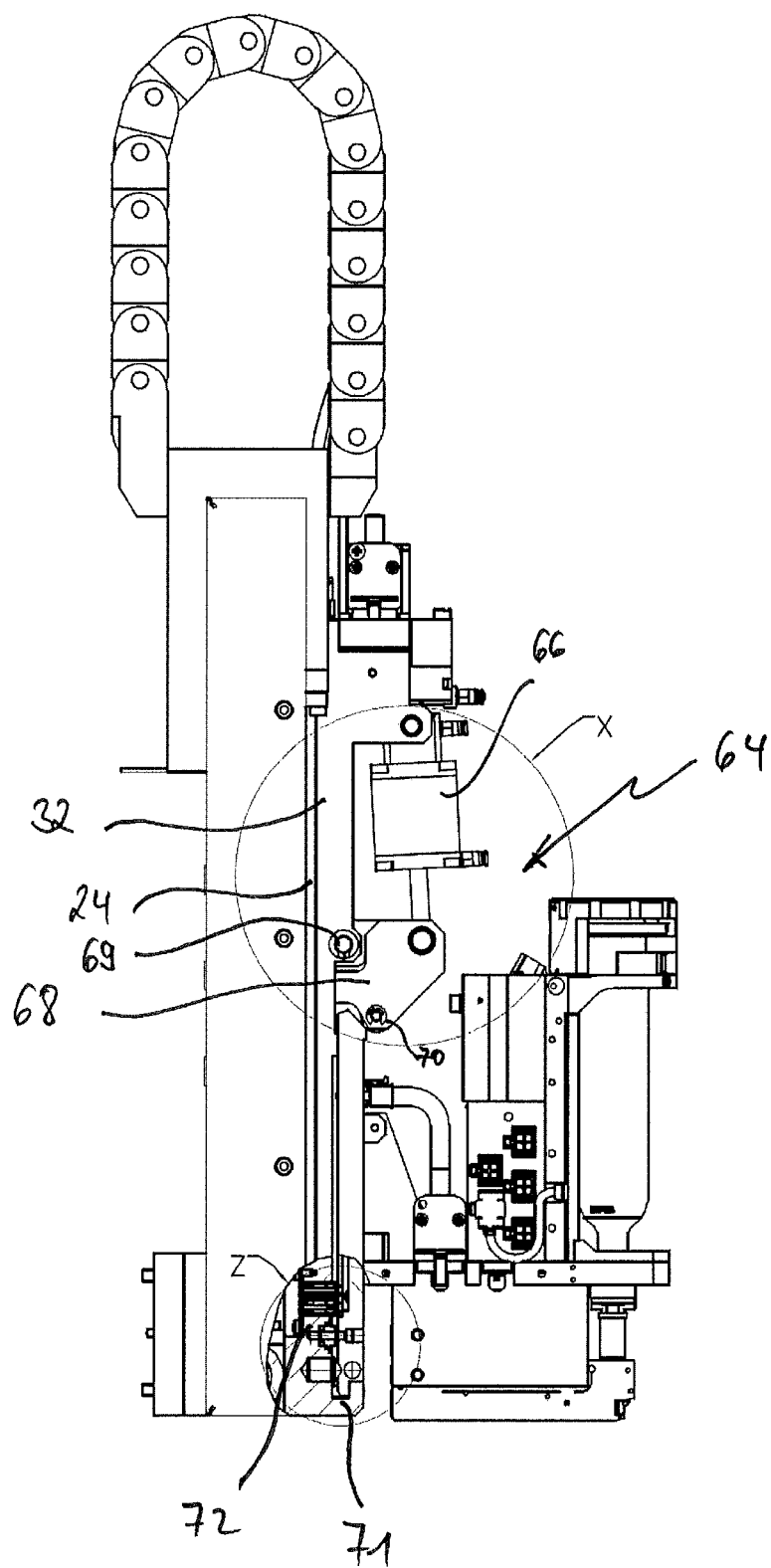
FIG. 13 shows a metering robot in accordance with the invention in the region of its cart, including the tool changer, movable along the third linear guide.
Figure 14:
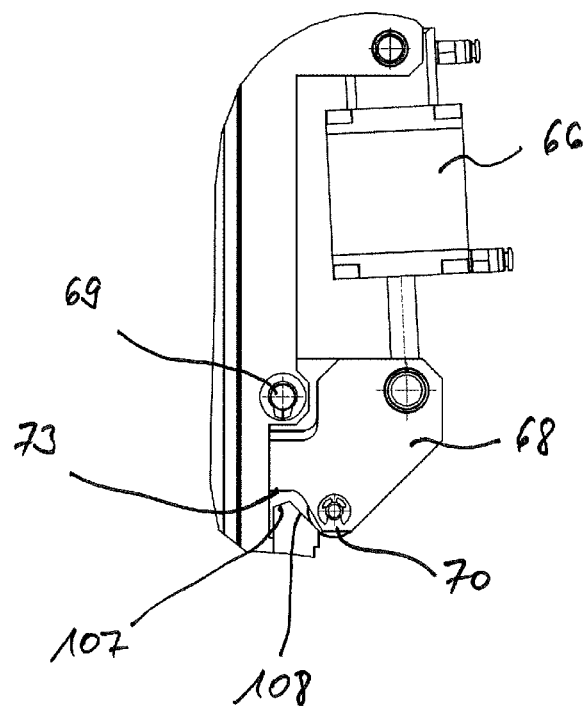
FIG. 14 shows detail "X" of FIG. 13 in an enlarged representation.
Figure 15:
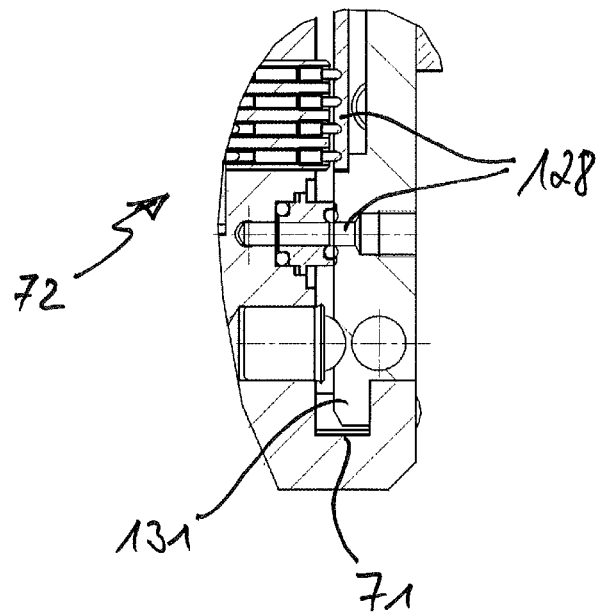
FIG. 15 shows detail "Z" of FIG. 13 in an enlarged representation.

As can be seen from FIG. 13 and in particular from detail "Z" of FIG. 13 shown in FIG. 15, the adapter unit 64 serving as a tool changer has an electric connection interface 72 and a pneumatic connection interface 72 that can be coupled to a counter-connection interface 128 at the adapter plate 103 of the metering unit 102 in order thus to supply the metering unit 102 with electric energy and compressed air or vacuum and with control signals. The coupling of the connection interface 72 to the counter-connection interface 128 of the adapter plate 103 in this respect takes place automatically when the adapter plate 103 is secured to the third cart 32 with the aid of the tool changer or of the gripping mechanism 68 so that no additional steps are necessary to close otherwise required plug-in connections or coupling connections between the robot 10 and the metering unit 102.

In the following, the tool holder 100 in accordance with the invention that serves to receive and provide metering units 102 that are just not being used by the metering robot 10 will now be described with reference to FIGS. 9 to 12. The metering units 102 parked in the tool holder 100 in this manner can be refilled or provided with new media cartridges 110 in the tool holder 100 and can be supplied from the tool holder 100 for later use by the metering robot 10.

Figure 9:
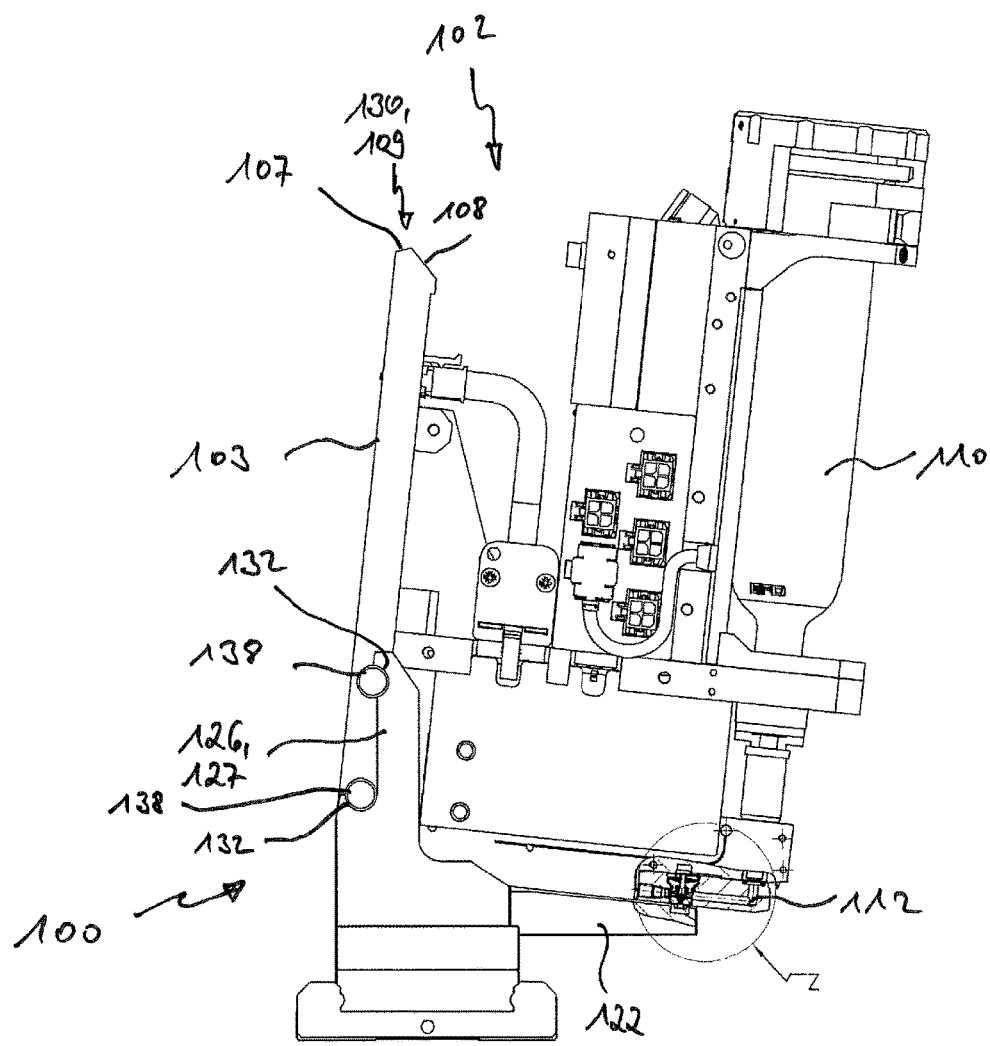
FIG. 9 shows a side view of an embodiment of a tool holder in accordance with the invention.

The tool holder 100 has a forked support 126 having two tines 127 offset from one another perpendicular to the drawing plane as well as a cantilever 122 projecting at a right angle therefrom for each metering unit 102 to be received by it, see FIG. 9, for example. The forked support 126 in this respect forms four semicircular or U-shaped recesses 132 for receiving four spigots 138 of which two respectively project laterally from the adapter plate 103 of each metering unit 102. The U-shaped recesses 132 are in this respect oriented perpendicular to one another so that a metering unit 102 can be hung by means of its spigots 138 into the recesses 132 of the tool holder 100.

The tool holder 100 can thus provide a plurality of metering unit 102 for use by the metering robot 10 in accordance with the invention, for which purpose the tool holder 100 can, for example, be located directly in front of the base 12 of the metering robot in FIG. 1 so that the latter can remove metering units 102 from the tool holder 100 by means of its tool changer 64 and can place it back into the tool holder 100 again. For this purpose, the portal bridge 18 is traveled along the first linear guide 20 up to directly to the work surface 14 so that the gripping mechanism 68 of the tool changer 64 can make use of the metering units 102, in particular their adapter plates 103, provided by the tool holder 100. To remove the metering unit 102 from the tool holder 100, the third cart 32 is first traveled upward a little until the third end 131 of the adapter plate 103 is received by the reception groove 71 of the third cart 32. The piston of the pneumatic cylinder 66 of the tool changer 64 is subsequently moved out, which has the consequence that the nose section 70 of the gripping mechanism 68 rides on the oblique surface 108 at the upper end of the adapter plate 103, which has the consequence on a progressing actuation of the pneumatic cylinder 66 that the metering unit 102 is pivoted to the left about the end 131 of the adapter plate 103 received by the reception groove 71 and is thus pulled toward the third cart 32 of the metering robot 10. In this respect, the counter-connection point 128 of the metering unit 102 is simultaneously coupled to the connection interface 72 of the tool changer 64 so that no separate worksteps arise for this. If the metering unit 102 received in this manner is to be replaced with a different metering unit 102 having a different medium or a different metering valve 104, for example, the metering robot 10 can thus place the metering unit 102 previously removed from the tool holder 100 back into it and can subsequently remove another metering unit 102 from the tool holder 100.

The metering units 102 provided by the tool holder 100 admittedly have normally closed metering valves 104 whose outlet nozzle 114 is closed by a valve ball 116 in the non-actuated state so that no medium can move into the outlet nozzle 114 of the metering valve 104 via the media channel 112 from the respective medium cartridge 110. If, however, any media residues collect in the region of the valve ball 116 or of the outlet nozzle 114, it cannot be precluded that further medium is administered from the metering valve 104.

To prevent this, the tool holder 100 has a sealing element 106 that seals the metering valve 104 of the respective metering unit 102 for each metering unit 102 received by it. The sealing element 106 is in this respect provided at a fixed position at the tool holder 100, which means that the sealing element 106 is automatically removed from the respective metering valve 104 when the metering unit 102 is removed from the tool holder 100.

Figure 10:
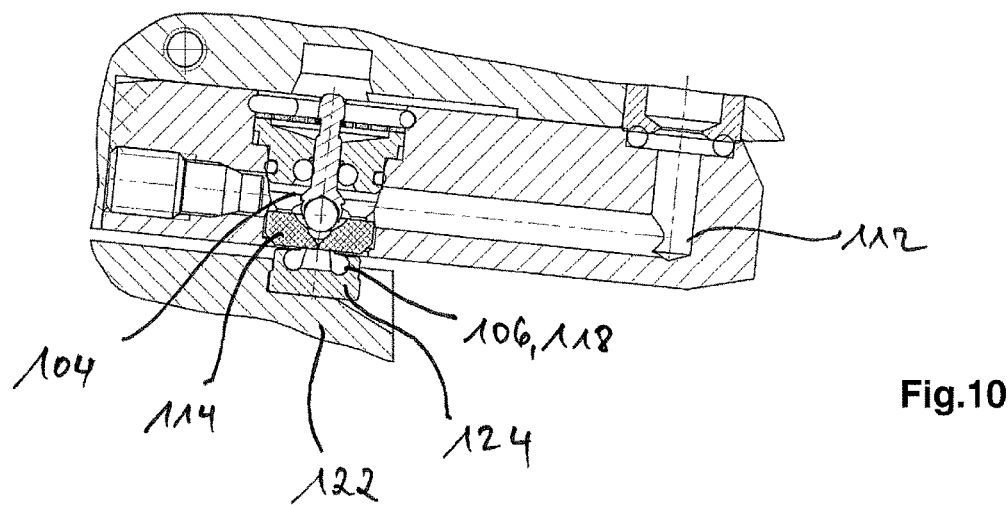
FIG. 10 shows detail "Z" of FIG. 9 in an enlarged representation.

In accordance with the embodiment shown in FIG. 10, the sealing element 106 can, for example, be an annular lip seal 118 that is in turn received by a cup 124 that is received by the cantilever 122. The annular lip seal 118 is in this respect fitted into a annular groove formed at the upper margin of the cup 124 and thus be easily replaced by levering out as required.

Figure 11:
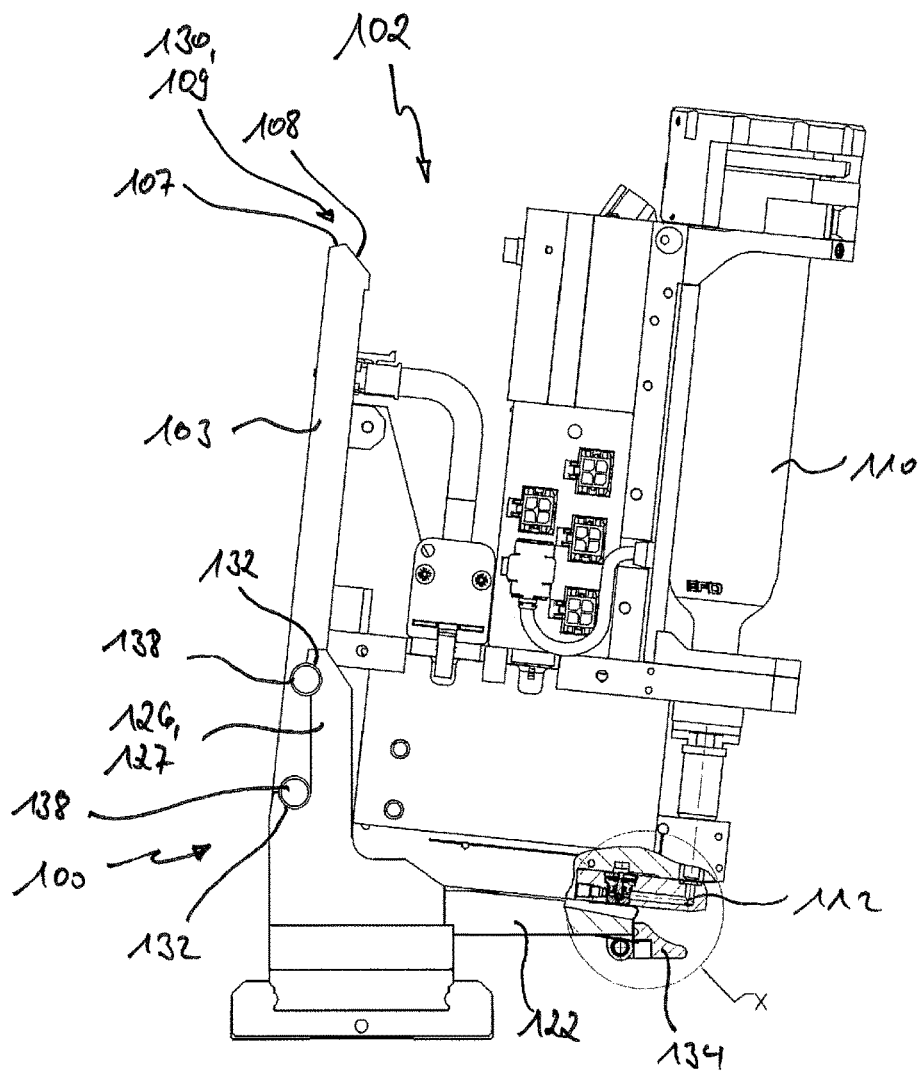
FIG. 11 shows a side view of a further embodiment of a tool holder in accordance with the invention.
Figure 12:
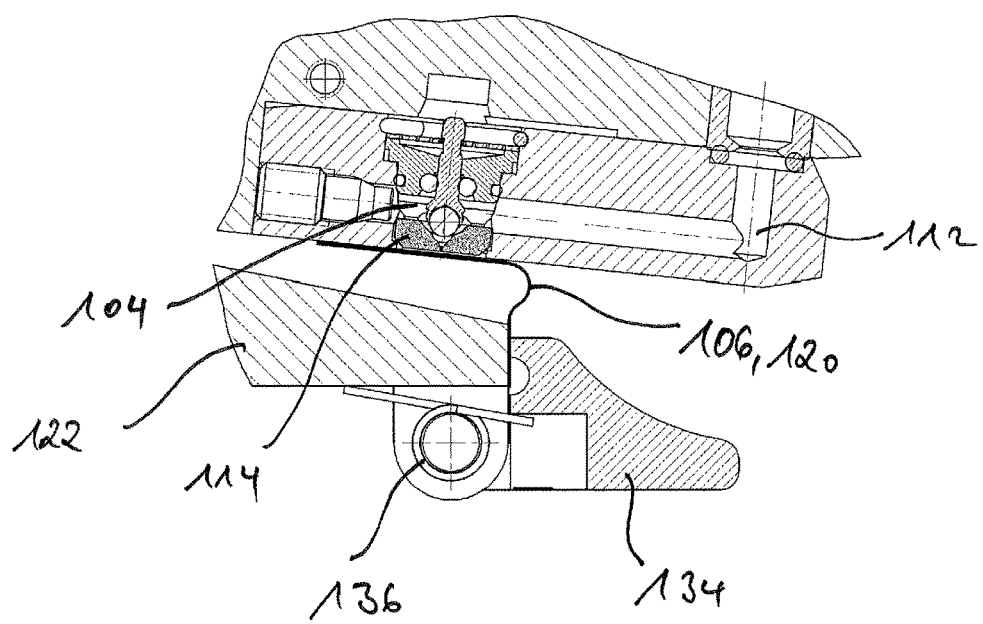
FIG. 12 shows detail "X" of FIG. 11 in an enlarged representation.

The embodiment shown in FIGS. 11 and 12 is a sealing element 106 about an adhesive strip 120 that is adhesively bonded over the outlet nozzle 114 of the metering valve 104. The adhesive strip 120 is in this respect preferably only adhesive in that region with which it is adhesively bonded to the outlet nozzle 114 of the metering valve 104 for sealing it. The oppositely disposed end of the adhesive strip 120 is, in contrast, clamped against the free end of the cantilever 122 of the tool holder 100 by means of a clamp 134 preloaded by a spring 136 and is thus releasably secured to the tool holder 100. If a metering unit 102 is removed from the tool holder 100, the adhesive strip 120 is automatically pulled off from the outlet nozzle 114. If the clamp 134 is released, the adhesive strip 120 can subsequently be replaced with a new adhesive strip 120 in order thus to seal the outlet nozzle 114 of a different metering unit 102.

In the embodiment in accordance with FIGS. 9 and 10 in which the sealing element 106 is formed by an annular lip seal 118, a suction apparatus, not shown, can additionally be integrated in the tool holder 11 with which a vacuum can be produced in the inner space of the cup 124. Any media residues can thus be removed from the outlet nozzle 114 by this suction apparatus so that no additional worksteps are required to manually remove such media residues.

REFERENCE NUMERAL LIST 10 metering robot
12 base
14 work surface
15 work space
16 recess for 14
17 drawer
18 portal bridge
20 first linear guide
22 second linear guide
24 third linear guide
26 screws
28 first cart
30 second cart
32 third cart
34 traverse section of 18
36 supports of 18
38 cantilever or projection
40 first drive motor
42 second drive motor
44 third drive motor
46 first drive belt
47 cover
48 third drive belt
50 traverse
52 stiffening ribs
54 drive roller
56 friction coating
60 light barrier
62 switch lug
63 width of 62
64 tool changer or adapter unit
66 pneumatic cylinder
68 gripping mechanism or lever mechanism
69 pivot pin
70 nose section
71 receiving groove
72 connection interface (electric/pneumatic)
73 pressing surface
74 light fence
100 tool holder
102 metering unit
103 adapter plate
104 metering valve
106 sealing element
107 oblique surface
108 oblique surface
109 gable roof-like contour
110 cartridge
112 media channel
114 outlet nozzle
116 valve ball
118 lip seal
120 adhesive strip
122 cantilever
124 cup
126 forked support
127 tines
128 counter-connection interface
130 upper end of 103
131 lower end of 103
132 recesses 134 clamp
136 spring
138 spigot

The invention claimed is:

1. A metering robot for dispensing liquid or pasty media having three degrees of freedom of movement oriented perpendicular to one another, the metering robot comprising:
 a base having two first linear guides spaced apart in parallel with one another;
 a portal bridge comprising two supports coupled to a traverse section, wherein the portal bridge is supported in a travelable manner on the two first linear guides, and wherein the portal bridge further comprises a second linear guide oriented perpendicular to the two first linear guides;
 a third linear guide configured to guide a cart for receiving a metering unit, wherein the third linear guide is oriented perpendicular to the two first linear guides and to the second linear guide, and wherein the third linear guide is configured to travel along the second linear guide, and
 a single drive motor configured to drive the portal bridge on the two first linear guides, wherein the single drive motor comprises a continuous motor shaft, wherein the continuous motor shaft comprises two shaft ends, wherein each shaft end drives one of two drive belts that are respectively coupled to the traverse section of the portal bridge, and wherein the single drive motor is located in a region that extends directly between the two first linear guides;
 wherein a work space of the metering robot extends in a region that is located in a longitudinal direction of the two first linear guides in a prolongation of the region that extends directly between the two first linear guides.

2. The metering robot in accordance with claim 1, wherein the two supports are supported in a travelable manner on the two first linear guides, wherein the traverse section spans a distance between the two first linear guides, and wherein the traverse section is located in a direction of the two first linear guides offset from points at which the two supports of the portal bridge are supported in a travelable manner on the two first linear guides.

3. The metering robot in accordance with claim 1, wherein at least one of the portal bridge and the base is designed in a hollow box construction.

4. The metering robot in accordance with claim 3, wherein at least one of the portal bridge and the base is composed of sheet steel having a thermal coefficient of expansion of 11 to $18*10^{-6}$ 1/K.

5. The metering robot in accordance with claim 3, wherein an inner space of the portal bridge designed in a hollow box construction is divided by stiffening ribs into a plurality of cells of which at least one is filled with a (polyurethane) foam or with another vibration-absorbing material.

6. The metering robot in accordance with claim 3, wherein an inner space of the base designed in the hollow box construction is at least partly filled with concrete.

7. The metering robot in accordance with claim 1, wherein the two drive belts are produced from steel.

8. The metering robot in accordance with claim 1, further comprising a second drive motor configured to drive the cart along the third linear guide, for which purpose this second drive motor is connected to the cart via a second drive belt.

9. The metering robot in accordance with claim 8, wherein the second drive motor has a drive roller that is mounted at its motor shaft, that drives the second drive belt and that is coated with a material that effects a coefficient of friction with respect to the second drive belt that is higher than a coefficient of friction of steel on steel.

10. The metering robot in accordance with claim 8, wherein the second drive motor comprises a braking device that blocks the second drive motor in a current-less state.

11. The metering robot in accordance with claim 1, wherein a plurality of light barriers uniformly spaced apart from one another are provided along the second and/or third linear guides, with the portal bridge, the third linear guide and/or of the cart for receiving the metering unit having a switch lug that interrupts the light barriers and that has a width that corresponds to half the spacing between two adjacent light barriers.

12. The metering robot in accordance with claim 1, wherein a hardenable leveling compound for compensating dimensional deviations of the construction respectively designed in a hollow box construction is provided between at least one guide element from a group of guide elements comprising the two first linear guides, the second linear guide, the third linear guide, and the cart that is movably guided by one of the first two linear guides, the second linear guide and the third linear guide, and a construction of the metering robot that is designed in the hollow box construction and to which the at least one guide element is fastened.

13. The metering robot in accordance with claim 1, wherein the cart is travelable along the third linear guide and has an adapter unit having a gripping mechanism for receiving the metering unit.

14. The metering robot in accordance with claim 13, wherein the gripping mechanism is pneumatically actuated and formed to secure an adapter of the metering unit in a shape-matched manner to the cart travelable along the third linear guide.

15. The metering robot in accordance with claim 13, wherein the adapter unit has an electric and/or pneumatic connection interface that is configured to couple with a counter-connection interface of the adapter of the metering unit to supply the adapter of the metering unit with electric energy and/or compressed air or vacuum and for a data exchange with the metering unit as a consequence of the securing of the adapter of the metering unit to the cart travelable along the third linear guide.

* * * * *